I. FRANK.
METHOD OF TESTING THE COLOR PERCEPTION AND THE SUSCEPTIBILITY TO LIGHT IRRITATION OF THE RETINA OF THE HUMAN EYE.
APPLICATION FILED FEB. 6, 1919.
1,354,900.
Patented Oct. 5, 1920.
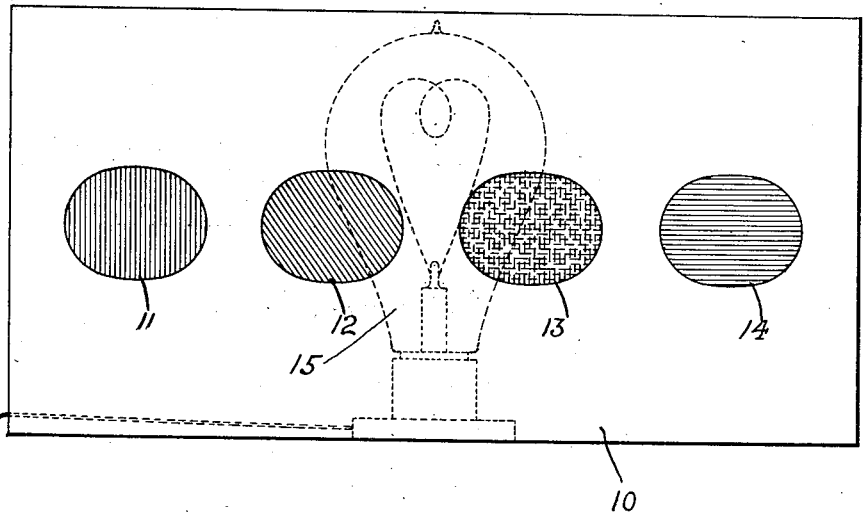
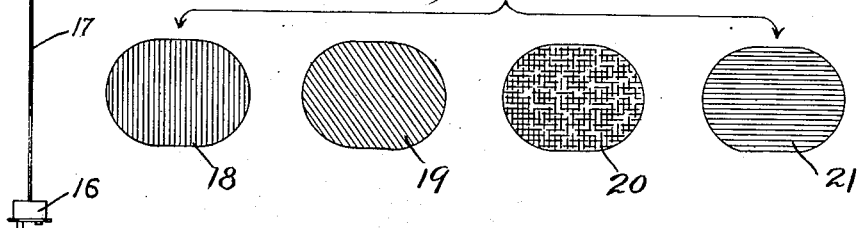
Isaiah Frank
INVENTOR

UNITED STATES PATENT OFFICE.

ISAIAH FRANK, OF NEW YORK, N. Y., ASSIGNOR OF ONE-HALF TO MOSES HIRAM HARRIS, OF NEW YORK, N. Y.

METHOD OF TESTING THE COLOR PERCEPTION AND THE SUSCEPTIBILITY TO LIGHT IRRITATION OF THE RETINA OF THE HUMAN EYE.

1,354,900.   Specification of Letters Patent.   Patented Oct. 5, 1920.

Application filed February 6, 1919. Serial No. 275,372.

*To all whom it may concern:*

Be it known that I, ISAIAH FRANK, a citizen of the United States, residing at New York city, in the county and State of New York, have invented certain new and useful Improvements in Methods of Testing the Color Perception and the Susceptibility to Light Irritation of the Retina of the Human Eye, of which the following is a specification.

The present invention relates to a method of accurately testing the degree of color perception or sensitiveness, and susceptibility to light irritation of the retina of the human eye, for the purpose of precisely determining the character of lens to be employed in correcting any departure from the normal in this respect.

Correction of abnormal color sensitiveness and susceptibility to light irritation is commonly effected by the use of tinted glasses. So far as I am aware, no scientific rule has heretofore been proposed for determining the precise tint or color gradation of the corrective glass, the general practice being based purely on empiricism in that the oculist or physician will try lens after lens until he has more or less accurately fitted the patient's eye.

Obviously such empirical practice is unsatisfactory and does not conduce to scientifically correct results, and the principal object of the present invention is to provide a method of determining the precise degree of color sensitiveness and susceptibility to light irritation of the human eye, to permit of selecting the proper lenses to correct this condition.

In practising the method of the present invention, the eye to be tested is directed toward an illuminated preferably translucent object of the color in respect to which the test for sensitiveness and susceptibility to irritation is to be made. Thereupon I interpose between the patient's eye and such illuminated object a translucent object of an approximately complementary color to the illuminated object, and such approximately complementary object may or may not be of the same color density as the illuminated object. The result aimed at is the entire neutralization of the color of the illuminated object, and if such neutralization results by the interposition between the eye and the illuminated object of an approximately complementary object of the same density as that of the illuminated object the retina is normal as to such color. If an approximately complementary object of greater density than that of the illuminated object is required for neutralization the retina is supersensitive to such color, while if an approximately complementary object of less density is required for the same purpose, the retina is deficiently sensitive to such color. The precise density of the approximately complementary object being known it is a routine matter for the oculist to prescribe the proper corrective lens.

In the accompanying drawing Figure 1 is a front view of the cabinet, and Fig. 2 is a plan view of a series of lenses adapted to be used with the cabinet.

A satisfactory and convenient procedure consists in using a cabinet 10 such as that conventionally illustrated in Fig. 1 of the accompanying drawing, and placing in the front panel thereof a series of translucent glass disks 11, 12, 13 and 14, each of a different color. The disks may be, respectively, red, green, yellow and blue, although it will of course be obvious that a greater or less number of disks, differently colored if desired, may be employed. Within the panel is an illuminant, such as the electric light bulb 15, the ignition and extinguishment of which may be controlled by a switch (not shown) operable from the button 16 at the end of the flexible depending cord 17 which extends into the cabinet and connects with the switch therein.

The patient is seated so that the several disks are visible to him. The eye to be tested remains exposed while the other eye may be covered. A series of plano ground translucent lenses shown in Fig. 2 and numbered 18 to 21 approximately complementary in color to each of the disks is provided. One lens of each series is of the same color density as the master disk, while the other lenses vary in density from such disk. Assume that the test is in respect of green; thereupon the red lens of the same density as the green disk is interposed between the eye and the disk, and if the green color of the illuminated disk is neutralized the retina of the eye is normal as to green. If not so neutralized, red lenses of different densities are used until complete neutralization is effected. If the proper lens is of greater density than the disk the eye is supersensitive to green, while if the lens is of less density than the disk the eye is deficiently sensitive to that color. Obviously, in either event, the lens determines the precise retinal color function of the eye and enables the oculist to select an absolutely accurate corrective glass to be worn by the patient.

The interposition of a translucent lens of a color complementary to the object viewed would filter out all rays from the object which would then appear white or black, depending upon the colors used. However, because of the impurity of the colors in ordinary tinted glasses some greenish light might be transmitted from a green object through a red glass, and since this green light will be combined with the other colors transmitted by both glasses it will not appear as green but as a mixture of the colors contained in common by the two glasses, so that the visible color will be a mixture and not a primary. It is to be noted, however, that inasmuch as the impurities above referred to are constant they will not affect the reliability nor accuracy of result of the test according to the present invention.

The procedure as to testing the eye in respect to the other colors is the same as that described for green, and need not be repeated.

I am aware that it is not broadly new to neutralize the color of an illuminated translucent disk by the use of a complementary colored disk or glass, and I am also aware that the use of color filters or screens is usual in several arts. I therefore lay no claim to either of these expedients, but what I claim as new and desire to secure by Letters Patent is:—

1. The herein described method of testing the color perception and susceptibility to light irritation of the retina of the human eye, which consists in successively interposing between the eye and a translucent colored illuminated object a series of translucent approximately complementary colored objects differing in color density from the first mentioned object and from each other until the color of such first mentioned object is completely neutralized.

2. The herein described method of testing the color perception and susceptibility to light irritation of the retina of the human eye, which consists in interposing between the eye and a colored illuminated glass disk a series of plano ground lenses approximately complementary in color to the disk but differing in color density therefrom and from each other, such interposition being continued until the colored illuminated disk is neutralized to the eye.

In testimony whereof I have affixed my signature in presence of two witnesses.

ISAIAH FRANK.

Witnesses:
 OTTO MUNK,
 CHAS. D. ERICH.